(12) United States Patent
Fan

(10) Patent No.: US 10,691,329 B2
(45) Date of Patent: Jun. 23, 2020

(54) USER INTERFACE OF MEDIA PLAYER APPLICATION FOR CONTROLLING MEDIA CONTENT DISPLAY

(71) Applicant: Simple design ltd., Tortola (GB)

(72) Inventor: Ping Fan, Zhengzhou (CN)

(73) Assignee: SIMPLE DESIGN LTD., Tortola (GB)

( * ) Notice: Subject to any disclaimer, the term of this patent is extended or adjusted under 35 U.S.C. 154(b) by 172 days.

(21) Appl. No.: 15/627,139

(22) Filed: Jun. 19, 2017

(65) Prior Publication Data

US 2018/0364901 A1 Dec. 20, 2018

(51) Int. Cl.
| | | |
|---|---|---|
| G06F 3/0488 | (2013.01) | |
| G06F 3/0484 | (2013.01) | |
| G06F 3/16 | (2006.01) | |
| G06F 3/0481 | (2013.01) | |
| G11B 27/34 | (2006.01) | |
| G11B 27/10 | (2006.01) | |
| G06F 3/0482 | (2013.01) | |

(52) U.S. Cl.
CPC ........ *G06F 3/04883* (2013.01); *G06F 3/0482* (2013.01); *G06F 3/04817* (2013.01); *G06F 3/04845* (2013.01); *G06F 3/04847* (2013.01); *G06F 3/165* (2013.01); *G11B 27/102* (2013.01); *G11B 27/34* (2013.01)

(58) Field of Classification Search
CPC ............... G06F 3/04883; G06F 3/0482; G06F 3/04817; G06F 3/04845; G06F 3/04847; G06F 3/165; G11B 27/00
See application file for complete search history.

(56) References Cited

U.S. PATENT DOCUMENTS

| | | | | |
|---|---|---|---|---|
| 9,171,506 | B2 * | 10/2015 | Ishihara | G06F 3/04845 |
| 9,830,061 | B1 * | 11/2017 | Wheeler | G06F 3/04847 |
| 2008/0084400 | A1 * | 4/2008 | Rosenberg | G06F 1/1626 |
| | | | | 345/173 |
| 2009/0153527 | A1 * | 6/2009 | Paczkowski | G06F 3/03547 |
| | | | | 345/184 |
| 2010/0277337 | A1 * | 11/2010 | Brodersen | G06F 3/04883 |
| | | | | 340/12.54 |
| 2010/0283754 | A1 * | 11/2010 | Nakao | G06F 3/04847 |
| | | | | 345/173 |
| 2010/0289768 | A1 * | 11/2010 | Nakao | G06F 3/04847 |
| | | | | 345/173 |

(Continued)

*Primary Examiner* — Amy M Levy
(74) *Attorney, Agent, or Firm* — Bayramoglu Law Offices LLC

(57) ABSTRACT

This application is directed to controlling media content display at an electronic device having a touch display. While playing media content on the touch display using a media player application, the electronic device detects a user swipe on the touch display including a sequence of contacts on a plurality of contact locations on the touch display. The electronic device determines a plurality of contact characteristics of the user swipe. The contact characteristics include a subset of contact locations of the sequence of contacts on the touch display. The user swipe is associated with a media play control option based on the contact characteristics. The media player application is then adjusted according to the media play control option while concurrently displaying a progressive indicator corresponding to the media play control option and the user swipe until after completion of the user swipe on the touch screen.

18 Claims, 8 Drawing Sheets

(56) References Cited

U.S. PATENT DOCUMENTS

| | | | | |
|---|---|---|---|---|
| 2011/0090407 | A1* | 4/2011 | Friedman | H04N 21/42204 348/734 |
| 2012/0013552 | A1* | 1/2012 | Ahn | G06F 3/04847 345/173 |
| 2012/0050185 | A1* | 3/2012 | Davydov | G06F 3/04883 345/173 |
| 2012/0179970 | A1* | 7/2012 | Hayes | G06F 3/04883 715/722 |
| 2012/0204106 | A1* | 8/2012 | Hill | G06F 3/04883 715/716 |
| 2012/0304114 | A1* | 11/2012 | Wong | G06F 3/0488 715/800 |
| 2013/0014052 | A1* | 1/2013 | Frey | G06F 3/013 715/800 |
| 2013/0088455 | A1* | 4/2013 | Jeong | G06F 3/04847 345/173 |
| 2014/0026101 | A1* | 1/2014 | Pallakoff | G06F 3/0482 715/841 |
| 2015/0002418 | A1* | 1/2015 | Okumura | G06F 3/041 345/173 |
| 2015/0026572 | A1* | 1/2015 | Cahill | G06F 3/0488 715/716 |
| 2015/0026613 | A1* | 1/2015 | Kwon | G06F 3/04886 715/764 |
| 2015/0026623 | A1* | 1/2015 | Horne | G06F 3/04847 715/771 |
| 2015/0346984 | A1* | 12/2015 | Flint | G06F 3/04847 715/720 |
| 2015/0370402 | A1* | 12/2015 | Checkley | H04N 21/41407 345/173 |
| 2015/0370455 | A1* | 12/2015 | Van Os | G06F 3/04842 345/173 |
| 2016/0011725 | A1* | 1/2016 | D'Argenio | G06F 3/04883 715/825 |
| 2016/0034117 | A1* | 2/2016 | Kim | G06F 3/04847 715/771 |
| 2016/0103589 | A1* | 4/2016 | Dziuk | G06F 16/44 715/716 |
| 2016/0188181 | A1* | 6/2016 | Smith | G06F 3/0416 715/765 |
| 2016/0269455 | A1* | 9/2016 | Casey | H04L 65/4069 |
| 2017/0068402 | A1* | 3/2017 | Lochhead | G06F 3/0488 |
| 2017/0075468 | A1* | 3/2017 | Dziuk | H04L 65/604 |
| 2017/0322722 | A1* | 11/2017 | Irvine | G06F 3/016 |
| 2017/0357390 | A1* | 12/2017 | Alonso Ruiz | G06F 3/0482 |
| 2018/0113591 | A1* | 4/2018 | Chen | G06F 3/0488 |
| 2018/0196595 | A1* | 7/2018 | Adderly | G06F 3/0416 |

* cited by examiner

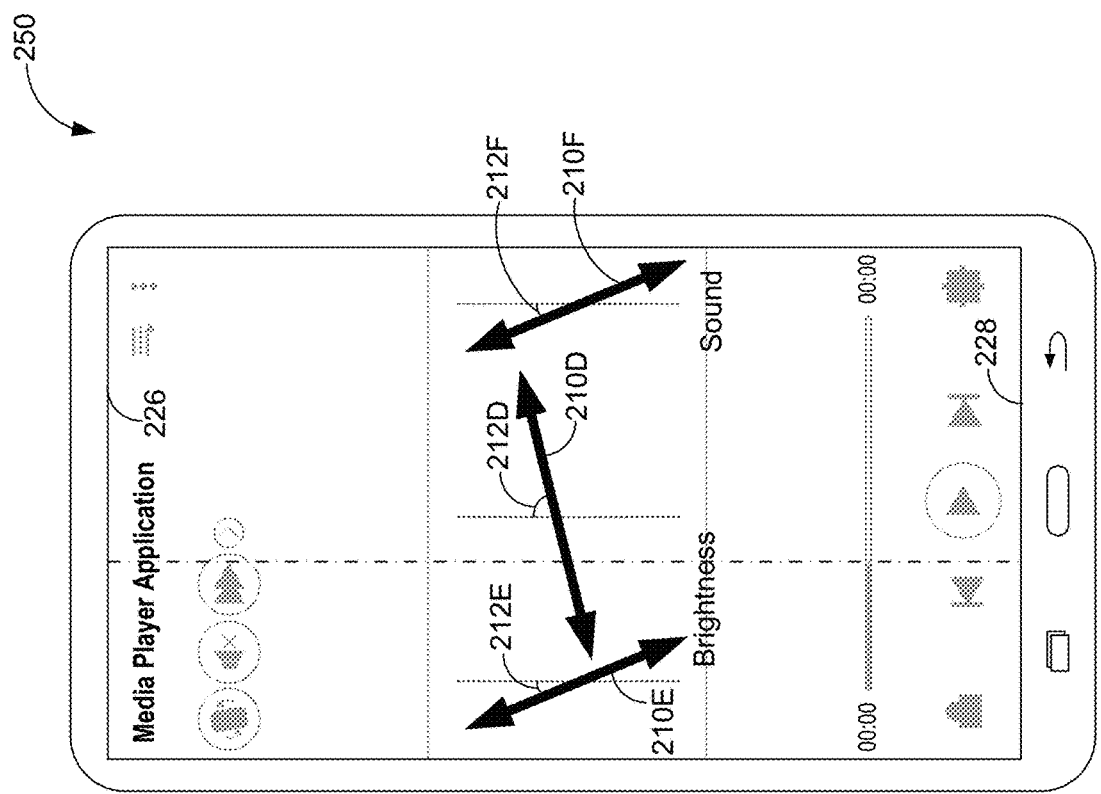
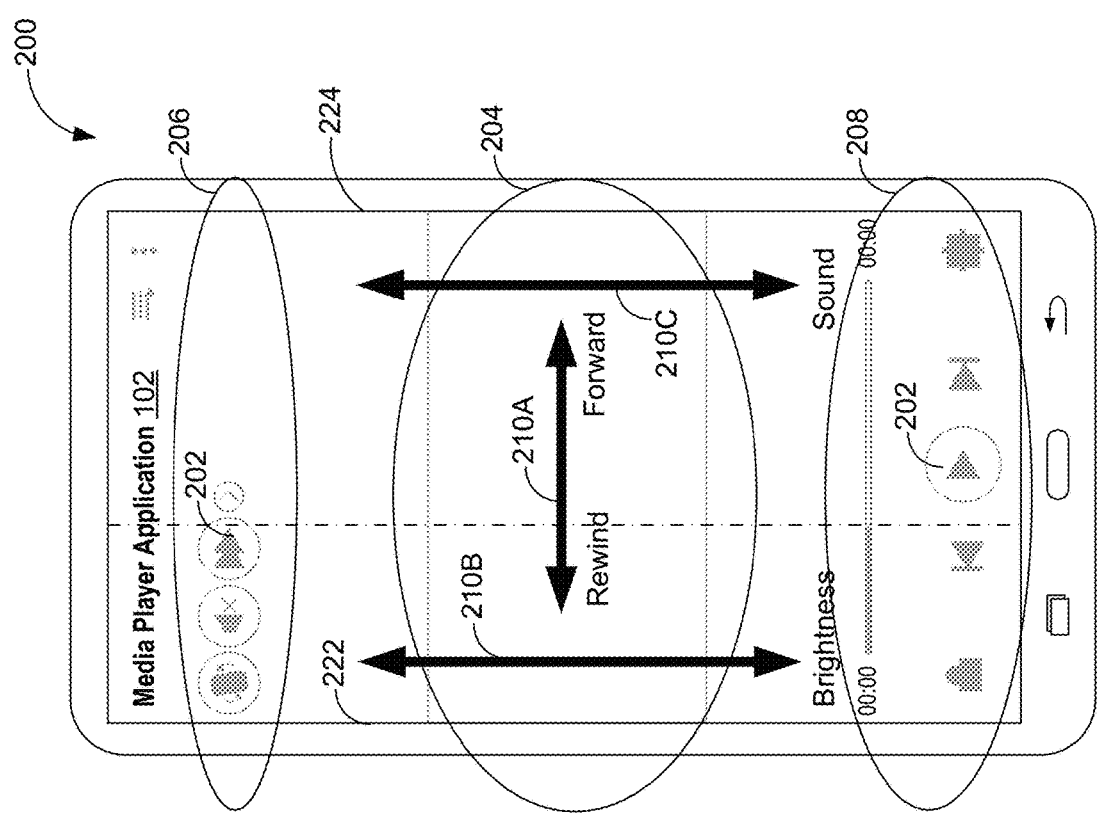
Figure 2B
Figure 2A

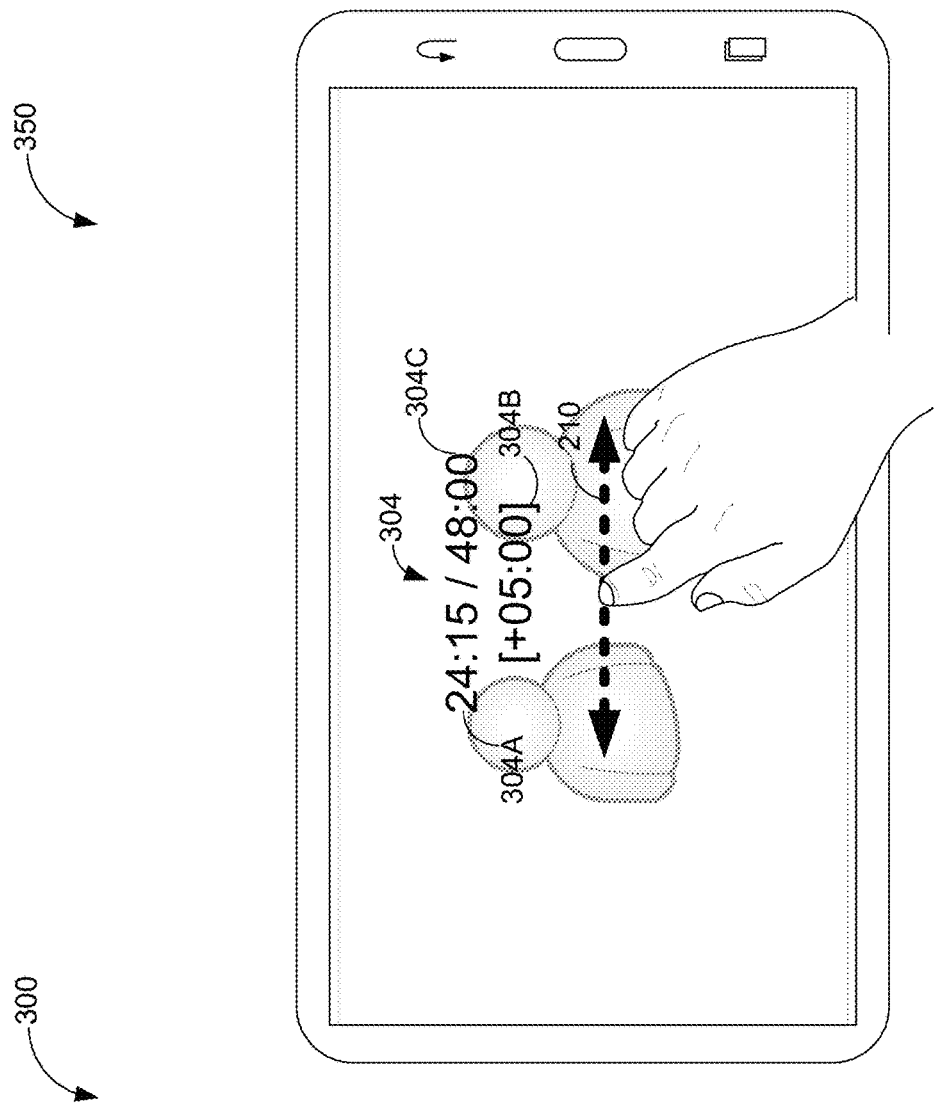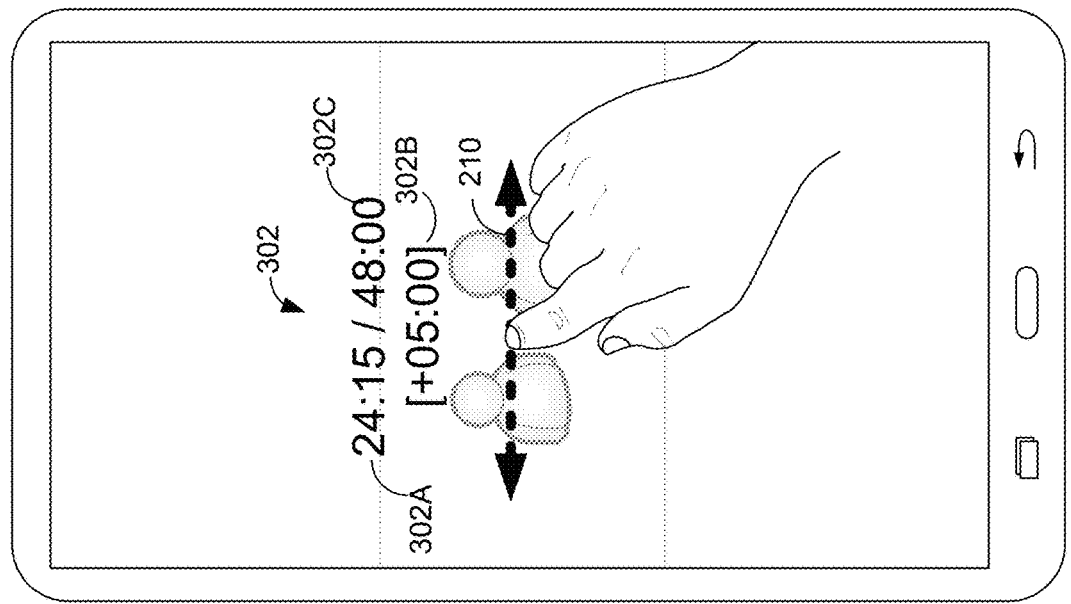
Figure 3B
Figure 3A

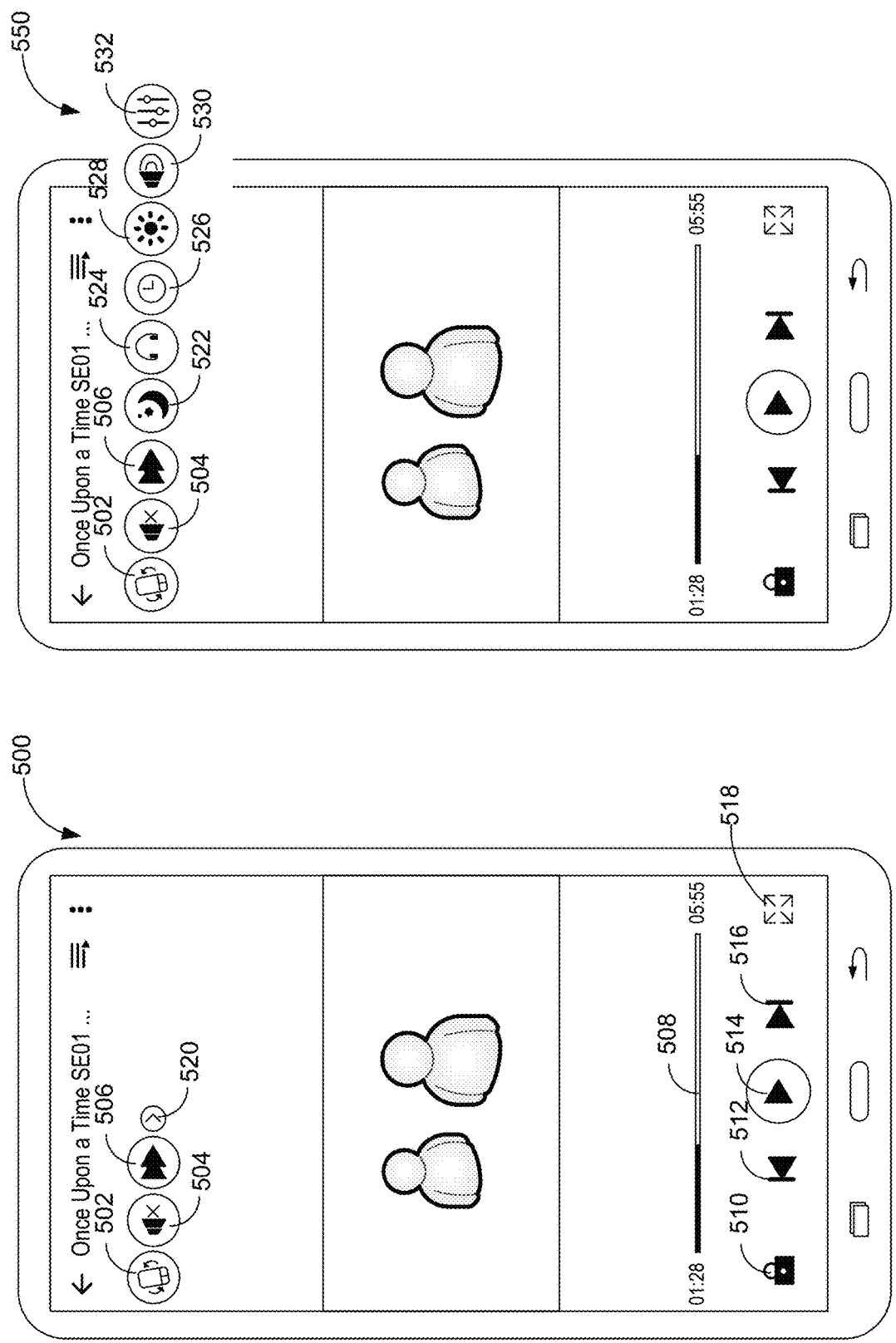

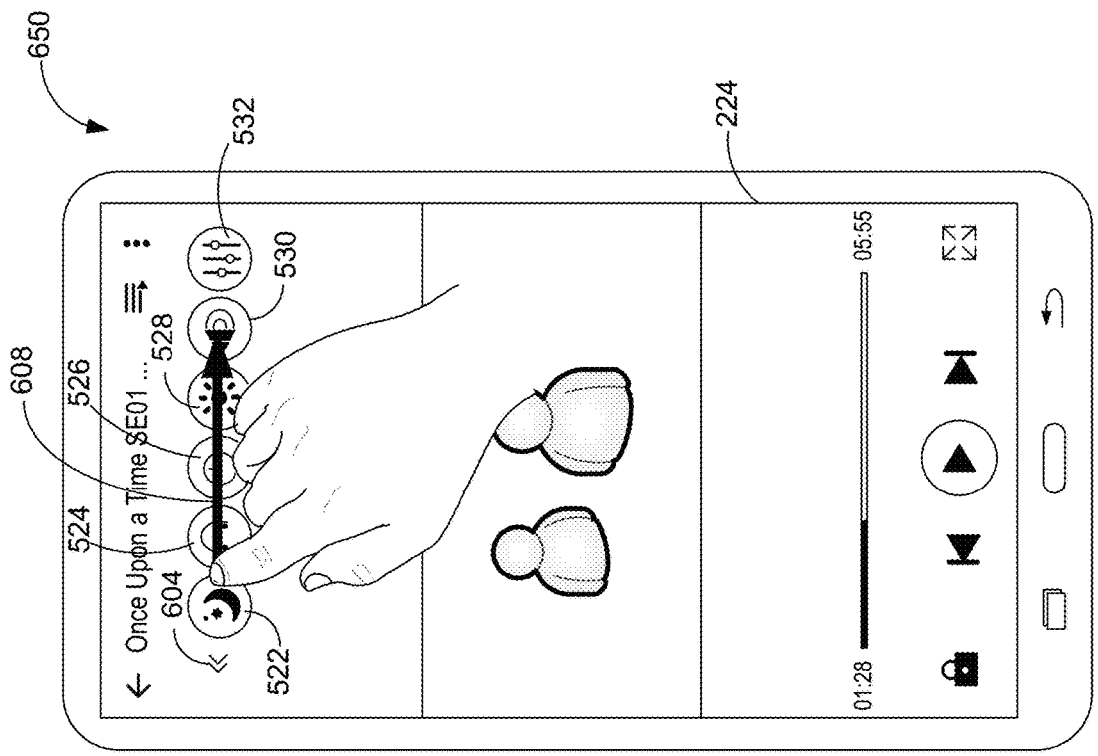
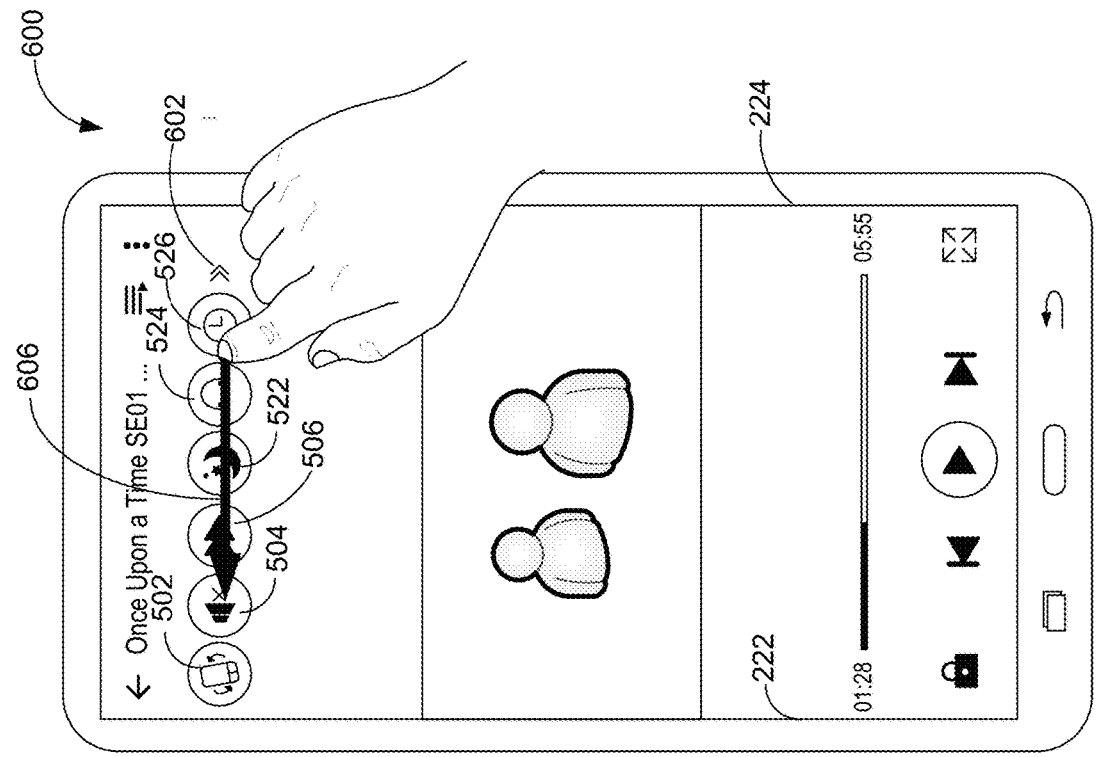
Figure 6A
Figure 6B

While playing media content on the touch display using a media player application, independently of display of any control icon of the media player application:

Detecting a user swipe on the touch display including a sequence of contacts on a plurality of contact locations on the touch display 702

Determining a plurality of contact characteristics of the user swipe 704

The plurality of contact characteristics include a subset of the plurality of contact locations of the sequence of contacts on the touch display 706

Determining an orientation angle of the user swipe with respect to a vertical axis of the touch display based on the subset of contact locations 708 comparing the orientation angle with a threshold angle 710

In accordance with the plurality of contact characteristics, associating the user swipe with one of a plurality of media play control options including a brightness adjustment, a sound adjustment and a forwarding/rewinding adjustment 712

Adjusting the media player application according to the media play control option associated with the user swipe while concurrently displaying a progressive indicator corresponding to the media play control option and the user swipe until after completion of the user swipe on the touch screen 714

Displaying a plurality of control icons on the media player application, while playing the media content on the touch display and adjusting the media player application according to the media play control option associated with the user swipe 716

Figure 7

USER INTERFACE OF MEDIA PLAYER APPLICATION FOR CONTROLLING MEDIA CONTENT DISPLAY

TECHNICAL FIELD

This application relates generally to computer technology, including but not limited to methods and systems for controlling media content display in a media player application.

BACKGROUND

Mobile devices apply media player applications to review multimedia content (e.g., video or audio content). A media player application is either a standalone application (e.g., a YouTube application) or an embedded component within another media management application (e.g., a Photo Album application). Regardless of being standalone or embedded, the media player application requires revoking control icons for controlling display of media content. For example, the media player application oftentimes displays a timeline concurrently with the media content, allowing a user to identify a location of a currently played frame on the timeline and to forward/rewind the display of the media content by dragging an indicator icon along the timeline. Alternatively, the media player application includes dedicated icons (e.g., a forward button and a rewinding button) for forwarding or rewinding the currently played media content in response to a user action on the dedicated icons.

In addition, both brightness and volume for the display of the media content are adjustable by a respective user action on a respective icon displayed on a user interface of the media player application. For example, while the media content is being displayed on the media player application, a user click revokes a display of a control panel including a volume control icon on the user interface of the media player application, and a second user swipe on the volume control icon increases or decreases the volume of the display of the media control in accordance with a scale of the second user swipe. Alternatively, the brightness and the volume can be controlled in the general settings of the mobile devices and outside the media player applications, and user actions are still required to revoke brightness and volume control icons and adjust the brightness and volume of the display of the media control via the brightness and volume control icons in the general settings of the mobile devices.

The user actions for adjusting the display of the media content oftentimes distract the user from reviewing the media content and compromise user experience of using the media player application. Thus, there is a need to reduce user actions and control the display of the media content effectively while the media content is displayed on the media player application.

SUMMARY

A need exists to create a user interface of a media player application that facilitates controlling media content display and enhances user experience with reviewing media content on the media player application. In accordance with some implementations, a user swipe is detected on a touch display of an electronic device while media content (e.g., a video clip) is played on the touch display using a media player application, without displaying any control icon of the media player application. One or more of contact characteristics (e.g., contact locations on the touch display, an orientation and a direction of the user swipe) are determined for identifying a media play control option. For example, a horizontal user swipe is associated with a forwarding or rewinding control on currently displayed media content, and a vertical user swipe is associated with a brightness control or a volume control depending on the contact locations of the vertical user swipe.

More specifically, in accordance with one aspect of the application, a method for controlling media content display is implemented at an electronic device having a touch display, a processor and memory storing at least one program for execution by the processor. The method includes while playing media content on the touch display using a media player application, without displaying any control icon of the media player application, detecting a user swipe on the touch display including a sequence of contacts on a plurality of contact locations on the touch display. The method further includes determining a plurality of contact characteristics of the user swipe, and the plurality of contact characteristics include a subset of the plurality of contact locations of the sequence of contacts on the touch display. The method further includes in accordance with the plurality of contact characteristics, associating the user swipe with one of a plurality of media play control options including a brightness adjustment, a volume adjustment and a forwarding/rewinding adjustment. The method further includes adjusting the media player application according to the media play control option associated with the user swipe while concurrently displaying a progressive indicator corresponding to the media play control option and the user swipe until after completion of the user swipe on the touch screen.

In accordance with another aspect of this application, an electronic device includes a touch display, one or more processors and memory. The memory includes one or programs executable by the processors to perform the above-described method.

In accordance with another aspect of this application, a non-transitory computer readable storage medium stores one or more programs configured for execution by an electronic device. The one or more programs include instructions for implementing the above-described method.

Other implementations and advantages may be apparent to those skilled in the art in light of the descriptions and drawings in this specification.

BRIEF DESCRIPTION OF THE DRAWINGS

For a better understanding of the various described implementations, reference should be made to the Description of Embodiments below, in conjunction with the following drawings in which like reference numerals refer to corresponding parts throughout the figures.

FIGS. 2A and 2B are two example user interfaces (UI) and of a media player application for receiving user inputs that control display of media content in accordance with some implementations.

FIG. 3A is an example vertical UI of a media player application for receiving user inputs that forward or rewind display of media content in accordance with some implementations.

FIG. 3B is an example horizontal UI of a media player application for receiving user inputs that forward or rewind display of media content in accordance with some implementations.

FIG. 5A is an example UI of a media player application 102 including a collapsed row of control icons in accordance with some implementations.

FIG. 5B is an example UI of a media player application showing a full row of control icons in accordance with some implementations.

FIGS. 6A and 6B are two example UIs of a media player application showing two distinct subset of control icons in accordance with some implementations.

FIG. 7 is a flow diagram illustrating a method for controlling media content display in accordance with some implementations.

Like reference numerals refer to corresponding parts throughout the several views of the drawings.

DESCRIPTION OF EMBODIMENTS

This application is directed to creating a user interface of a media player application that facilitates control of media content display without interfering with display of the media content. Specifically, in some implementations, a user swipe is detected on a touch display of an electronic device while media content is played on the touch display using a media player application. Such detection is independent of display of any control icon of the media player application (i.e., regardless of whether any control icon of the media player application is displayed). One or more of contact characteristics (e.g., contact locations on the touch display, an orientation and a direction of the user swipe) are determined for identifying a media play control option. For example, a substantially horizontal user swipe is associated with a forwarding or rewinding control on currently displayed media content, and a substantially vertical user swipe is associated with a brightness control or a volume control depending on the contact locations of the vertical user swipe.

Figure 1:
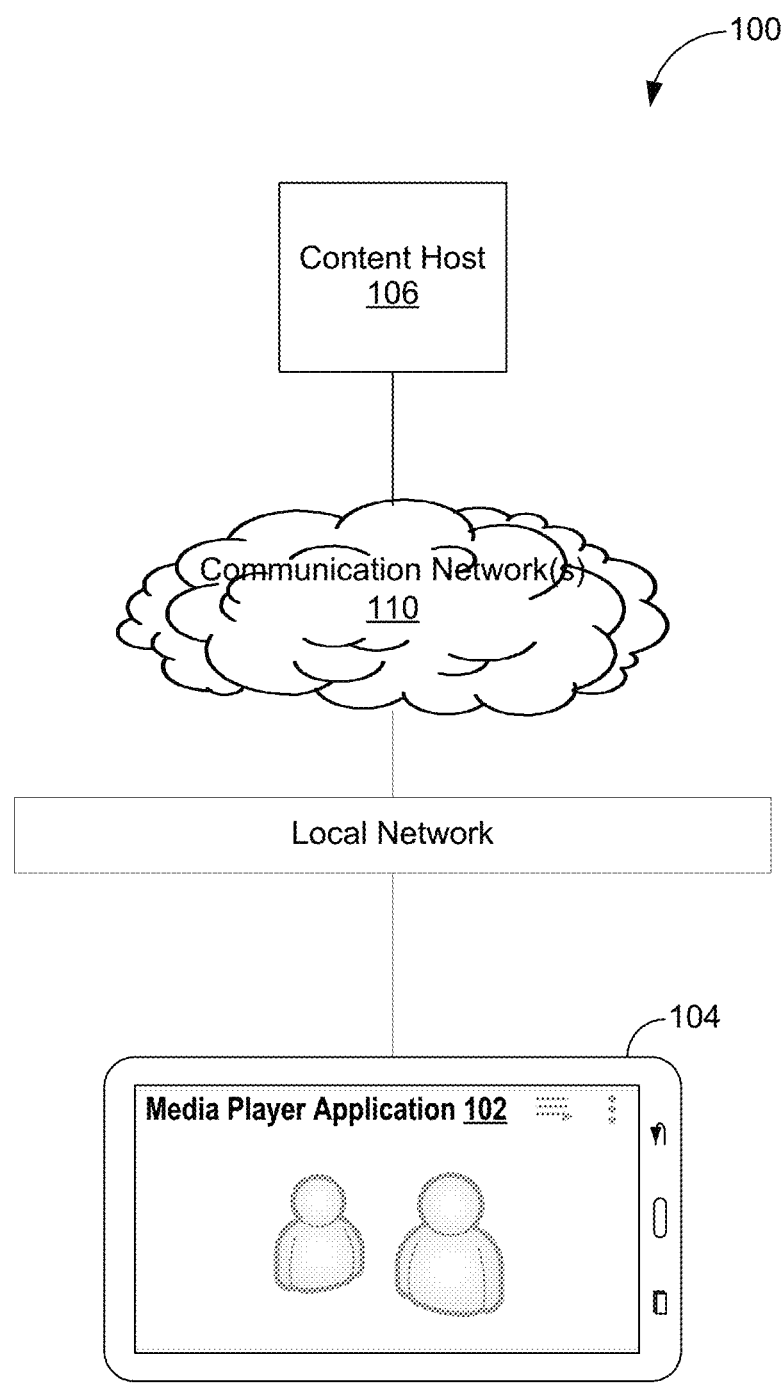
FIG. 1 is an example operating environment in which a media player application is executed on an electronic device for displaying media content obtained locally or remotely in accordance with some implementations.

FIG. 1 is an example operating environment 100 in which a media player application 102 is executed on an electronic device 104 for displaying media content (e.g., video clip) obtained locally or remotely in accordance with some implementations. The electronic device 104 is communicatively coupled to a remote server (e.g., a media content host 106) via one or more communication network 110, and is configured to exchange data with the remote server. Specifically, in some implementations, the electronic device 104 receives media content information from the media content host 106, and displays media content received from the media content host 106 on a user interface of the media player application 102. The electronic device 104 may be bound to a user account managed by the media content host 106, and provides the media content in association with the user account. Alternatively, in some implementations, the electronic device 104 obtains media content that is stored locally (e.g., video clips stored in local memory of the electronic device 104), and displays the locally stored media content in the media player application 102. Optionally, the media player application 102 is a dedicated media application (e.g., YouTube), or part of another media content management application (e.g., an image/video review function of Photos in an iOS operating system).

The electronic device 104 has a touch display, a processor and memory storing at least one program for execution by the processor. While playing media content on the touch display using the media player application 102, the electronic device 104 detects a user swipe on the touch display, and determines a plurality of contact characteristics (e.g., contact locations, swipe orientation, and swipe direction) of the user swipe. In accordance with the plurality of contact characteristics, the electronic device 104 associates the user swipe with one of a plurality of media play control options including a brightness adjustment, a volume adjustment and a forwarding/rewinding adjustment. The media player application 102 is then adjusted according to the media play control option associated with the user swipe while concurrently displaying a progressive indicator corresponding to the media play control option and the user swipe until after completion of the user swipe on the touch display. As such, each of the plurality of media play control options is implemented independently of any control icon of the media player application (e.g., the respective media play control option is applicable when no control icon is displayed on the media player application 104 for enabling the respective media play control option). In some implementations, only one progressive bar corresponding to the media play control option is displayed at a predefined location on the touch display and it disappears from the touch display shortly after the completion of the user swipe (e.g., with a 0.1 second-0.3 second delay). The media player application 102 resumes its operation mode before detecting the user swipe. During this process, no progressive bar corresponding to other media play control options is displayed on the touch display since the location of the user swipe on the touch display is designated to a particular media play control option, which can be one of a brightness adjustment, a volume adjustment and a forwarding/rewinding adjustment. As will be described below, these different media play control options may have corresponding progressive bars of different shapes. Because they do not appear on the touch display at the same time, they can therefore be located at the same location (e.g., the center of the touch display).

Examples of a representative electronic device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more communication networks 110 include local area networks (LAN) and wide area networks (WAN) such as the Internet. The one or more networks 100 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the operating environment 100 shown in FIG. 1 includes both a client-side portion (e.g., the media player application 102) and a server-side portion. The division of functionalities between the client and server portions of operating environment 100 can vary in different implementations. In some implementations, the media player application 102 at the client side is a thin-client that provides only user-facing input and output processing functions, and delegates all other data processing functionalities to a backend server (e.g., the media content host 106). Although many aspects of the present technology are described from the perspective of the client-side electronic device 104, the corresponding actions performed by the media content server 106 would be apparent to ones skilled in the art without any creative efforts. Furthermore, some aspects of the present technology may be performed by the media content host 106 and the electronic device 104 cooperatively.

FIGS. 2A and 2B are two example user interfaces (UI) 200 and 250 of a media player application 102 for receiving user inputs that control display of media content in accordance with some implementations. The media player application 102 plays media content (e.g., video, audio or still images) on a touch display of the electronic device 104. When the media content is displayed, the UI 200 and 250 is optionally oriented according to a landscape view or a portrait view. In some implementations not shown in FIGS. 2A and 2B, the media content is displayed in a full screen mode (e.g., scaled to display at a maximum area of the display), and one or more control icons 202 are displayed overlapping the media content. In some implementations, the media content is displayed in a central region 204 of the UI, and the one or more control icons 202 are displayed on a top region 206 or bottom region 208 external to the central region 204. In some implementations, regardless of whether the media content (e.g., a video stream played on the touch display) is displayed in a full screen mode or not, no control icon 202 is displayed concurrently with the media content, and all or a predefined subset of the one or more control icons 202 show up on the display in response to a user action on the UI (e.g., a brief or extended touch on any area of the UI).

In some implementations, the user inputs that are received for controlling display of the media content include a user swipe 210 (e.g., 210A, 210B and 210C). The user swipe 210 further includes a sequence of contacts on a plurality of contact locations on the touch display, and is detected on the touch display while the media content is displayed on the touch display using the media player application 102. Referring to FIG. 2A, the user swipe 210 is substantially parallel with one of orthogonal edges of the touch display of the electronic device 104. In an example, the user swipe 210A is substantially parallel with a horizontal edge (e.g., a short edge while the touch display is oriented in a portrait view or a long edge while the touch display is oriented in a landscape view) of the touch display. In another example, the user swipe 210B or 210C is substantially parallel with a predefined edge (e.g., a long edge associated with the portrait view or a short edge associated with the landscape view) of the touch display.

The user swipe 210 is associated with one of a plurality of media play control options according to at least an orientation and a direction of the user swipe 210. For example, the user swipe 210A that is parallel with the horizontal edge is associated with a forwarding/rewinding adjustment. When the user swipe 210A moves from left to right, it is associated with a forwarding adjustment. When the user swipe 210A moves from left to right, it is associated with a rewinding adjustment. Alternatively, in some implementations, the user swipe 210B that is parallel with the predefined edge is associated with a brightness or sound volume adjustment. When the user swipe 210B moves upwards, it causes an increase in the brightness or volume of the electronic device 104. When the user swipe 210B moves downward, it causes a decrease in the brightness or volume of the electronic device 104.

In some implementations, the user swipe 210 is associated with one of the plurality of media play control options according to a location of the user swipe 210 in addition to the orientation and the direction of the user swipe 210. Stated another way, the user swipes 210 having the same orientation and direction may be associated with different media play control options according to their respective locations on the touch display. For example, both the user swipes 210B and 210C are substantially parallel with the predefined edge of the touch display, but are located on a left region and a right region of the touch display, respectively. When the user swipe 210B that is substantially parallel with the predefined edge is detected in the left region of the touch display, it is associated with the brightness adjustment; when the user swipe 210B that is substantially parallel with the predefined edge is detected at the right region of the touch display, it is associated with the sound volume adjustment. In some implementations, the left region used for the brightness adjustment and the right region used for the volume adjustment do not overlap with each other. Optionally, the left region used for the brightness adjustment and the right region used for the volume adjustment split the area of the touch display equally or unequally.

Referring to FIG. 2B, the user swipe 210 is not parallel with any of the orthogonal edges of the touch display of the electronic device 104. It is determined that the user swipe 210 has an orientation angle 212 (0-90 degrees) with respect to a predefined edge (e.g., edge 222 or 224) of the touch display. The orientation angle 212 is compared with one or more threshold angles. In an example, the orientation angle 212D of the user swipe 210D is greater than a predetermined threshold angle (e.g., 45 or 60 degrees), the user swipe 212D is associated with a forwarding/rewinding adjustment. Further, in some implementations, in accordance with a determination that the user swipe 210D moves towards a right edge 224 of the touch display, the media player application 102 fast forwards the display of the media content to a subsequent frame of the media content concurrently as the user swipe 210D moves on the touch display. In accordance with a determination that the user swipe moves towards a left edge 222 of the touch display, the media player application 102 rewinds the display of the media content to a previous frame of the media content concurrently as the user swipe 210D moves on the touch display.

In another example, the orientation angle 212 of the user swipe 210 is not greater than the predetermined threshold angle, and the user swipe 212 is associated with a brightness or volume adjustment. The touch display includes a volume control region and a brightness control region that do not overlap with each other. When the orientation angle of the user swipe 210 is not greater than the predetermined threshold angle, the sequence of contacts of the user swipe 210 are located with respect to each of the volume control region and the brightness control region. In some implementations, the media player application 102 associates the user swipe 210E with the brightness adjustment, after determining that the user swipe 210E is located substantially within the brightness control region (e.g., determining that the start location or the predefined starting portion of the user swipe 210E is located within the brightness control region). Further, in accordance with a determination that the user swipe moves towards a top edge 226 or a bottom edge 228 of the touch display, the media player application 102 increases or decreases brightness associated with the display of the media content according to the relative positions of the user swipe 210E on the touch display, respectively.

Alternatively, in some implementations, the media player application 102 associates the user swipe 210F with the volume adjustment, after determining that the user swipe 210F is located substantially within the volume control region (e.g., determining that a start location or a predefined starting portion of the user swipe 210F is located within the volume control region). Further, in accordance with a determination that the user swipe 210F moves towards atop edge 226 or a bottom edge 228 of the touch display, the media player application 102 increases or decreases a volume associated with the display of the media content according to relative positions of the user swipe 210F on the touch display, respectively.

In some implementations, the orientation angle 212 of the user swipe 210 is measured as an acute or right angle (0-90 degrees) formed between the user swipe 210 and the pre-defined edge 202 or 204 of the touch display. It is noted that the brightness control region and the volume control region are pre-defined, and can be redefined if needed. With that said, in some implementations, the brightness control region is located on the right of the volume control region. Further, in some implementations, the orientation, direction and located region of the user swipe 210 are determined using a start location and/or a predefined starting portion of the user swipe, such that the media control option associated with the user swipe 210 could be determined promptly when the user swipe 210 starts. Optionally, the orientation, direction and located region of the user swipe 210 are updated as the user swipe 210 moves on the touch display.

FIG. 3A is an example vertical UI 300 of a media player application 102 for receiving user inputs that forward or rewind display of media content in accordance with some implementations. FIG. 3B is an example horizontal UI 350 of a media player application 102 for receiving user inputs that forward or rewind display of media content in accordance with some implementations. The media player application 102 plays the media content (e.g., video, audio or still images) on a touch display of the electronic device 104. For example, the media content is displayed on the UI 300 and 350 in a portrait view and a landscape view, respectively. As explained above, the media content may be displayed in a full screen mode (e.g., scaled to display at a maximum area of the display) in the UI 350. In contrast, the media content is displayed in the central region 204 of the UI 300 while leaving the top and bottom regions blank. No control icon 202 is displayed on the UIs 300 and 350 concurrently with the media content, while all or a predefined subset of the one or more control icons 202 can show up on the display in response to a user action on the UIs.

Referring to FIGS. 3A and 3B, after associating a user swipe 210 with one of a plurality of media play control options, the media player application 102 is then adjusted according to the media play control option associated with the user swipe 210 while concurrently displaying on the UI 300 and 350 a progressive indicator (e.g., 302 and 304) corresponding to the media play control option and the user swipe 210 until after completion of the user swipe on the touch display. As explained above, the user swipe 210 includes a sequence of contacts on a plurality of contact locations on the touch display. The plurality of contact characteristics used to determine the corresponding media play control option include one more of a subset of the plurality of contact locations of the sequence of contacts on the touch display, an orientation of the user swipe 210, and a direction of the user swipe 210. The subset of the plurality of contact locations of the sequence of contacts include at least a start location of the user swipe 210 on the touch display and one or more contact locations subsequent to the start location.

In some implementations, the adjustment of the media player application tracks the user swipe 210 substantially in real time, and the start location and the one or more contact locations subsequent to the start location are used to determine the one of the plurality of media play control options. Specifically, the start location and the one or more subsequent contact locations are used to determine the orientation of the user swipe 210, the direction of the user swipe 210, and/or whether the user swipe 210 is substantially located in the brightness control region or the volume control region.

When the media play control option associated with the user swipe 210 is a forwarding adjustment, the display of the media content is forwarded to a subsequent frame of the media content according to a displacement of each of the contact location of the user swipe 210 with respect to the start location of the user swipe 210. In an example, each displacement of 1 mm is associated with a predetermined media content length of 5 seconds. Thus, at each contact location of the user swipe 210, the display of the media content is forwarded to the respective subsequent frame of the media content for a media length of 5 seconds for every 1 mm displacement of the user swipe 210, thereby tracking the user swipe 210 substantially in real time. The progressive indicator 302 indicates one or more of a timestamp 302A of each frame to which display of the media content is forwarded on the touch display and a relative change of play times 302B due to the forwarding adjustment. In some implementations, the progressive indicator 302 indicates a total length 302C of the media content.

Similarly, when the media play control option associated with the user swipe 210 is a rewinding adjustment, the display of the media content is rewound to a previous frame of the media content according to a displacement of each of the contact location of the user swipe 210 with respect to the start location of the user swipe 210. The progressive indicator 304 indicates one or more of a timestamp 304A of each frame to which display of the media content is rewound and a relative change of play times 304B due to the rewinding adjustment. In some implementations, the progressive indicator 302 indicates a total length 304C of the media content.

Figure 4B:
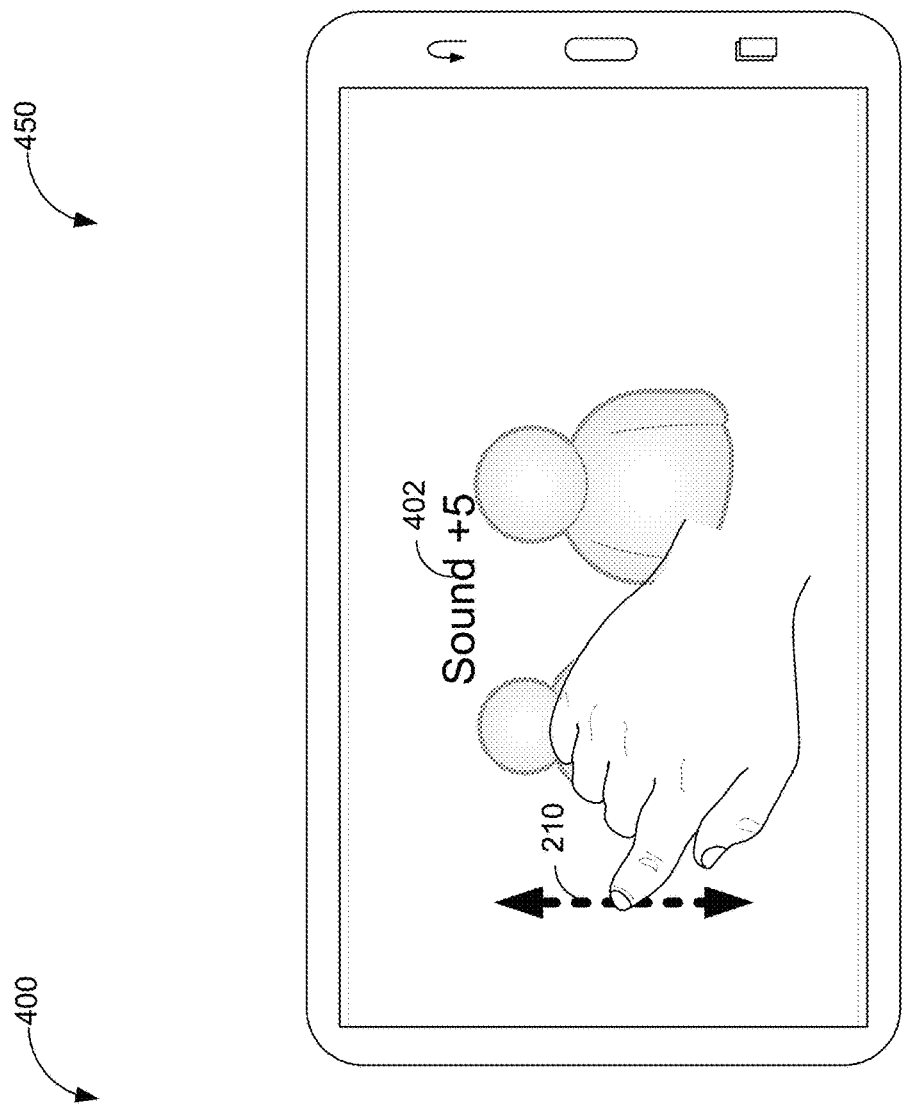
FIGS. 4A and 4B are example vertical and horizontal UIs of a media player application for receiving user inputs that adjust volume associated with display of media content in accordance with some implementations, respectively.
Figure 4A:
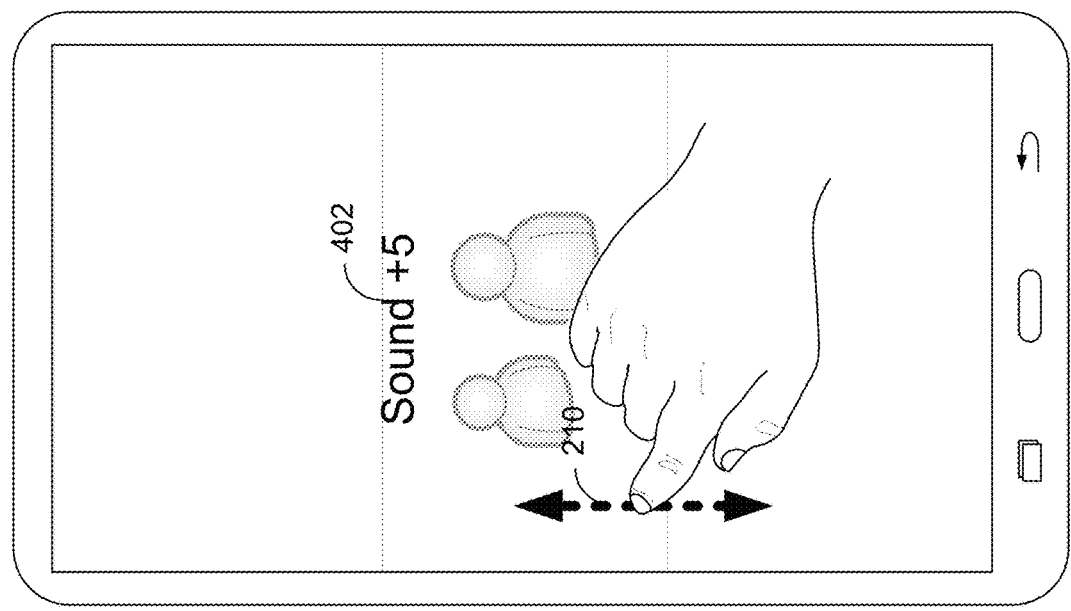

FIGS. 4A and 4B are example vertical and horizontal UIs 400 and 450 of a media player application 102 for receiving user inputs that adjust volume associated with display of media content in accordance with some implementations, respectively. The media play control option associated with the user swipe 210 is determined as a volume adjustment. The volume associated with the display of the media content is increased or decreased according to a displacement of each of the contact location of the user swipe 210 with respect to the start location of the user swipe 210. In an example, each displacement of 1 mm is associated with an increase or decrease of a volume level by a volume unit of 2. Thus, at each contact location of the user swipe 210, the volume associated with the display of the media content is adjusted by the volume unit of 2 for every 1 mm displacement of the user swipe 210, thereby tracking the user swipe 210 substantially in real time. The progressive indicator 402 indicates a change (an increase or a decrease) of the volume associated with the display of the media content.

Similarly, when the media play control option associated with the user swipe 210 is a brightness adjustment, the brightness associated with the display of the media content is increased or decreased according to a displacement of each of the contact location of the user swipe 210 with respect to the start location of the user swipe 210. At each contact location of the user swipe 210, the brightness associated with the display of the media content is adjusted to track the display of the media content to track the user swipe 210 substantially in real time. The progressive indicator indicates a change (an increase or a decrease) of the brightness associated with the display of the media content.

FIG. 5A is an example UI 500 of a media player application 102 including a collapsed row of control icons 502-506 in accordance with some implementations. FIG. 5B is an example UI of a media player application showing a full row of control icons in accordance with some implementations. In some situations, while playing media content, the media player application 102 does not display any control icon (e.g., the icons 502-506, a display timeline 508, a lock icon 510, a rewinding icon 512, a play/pause icon 514, a forwarding icon 516, and a full screen icon 518) concurrently with the media content. A predefined subset of the one or more control icons can show up on the display in response to a user action (e.g., a click) on the UI of the media player application.

The collapsed row of control icons includes a device rotation icon 502, a mute icon 504 and a speed icon 506, and is associated with a first collapse control icon 520. The collapsed row of control icons (FIG. 5A) is associated with a full row of control icons (FIG. 5B) including one or more of a night mode icon 522, an audio mode icon 524, a timer icon 526, a brightness icon 528, a volume icon 530 and an equalizer icon 532 in addition to the icons 502-506. In some implementations, the full row of control icons can be displayed in one or more rows on the UI of the media player application. Alternatively, in some implementations, the full row of control icons includes more icons than those that can be displayed within the width of the touch display. Specifically, in response to a user activation of the first collapse control icon 520, the collapsed row of control icons is expanded, and a subset of the full row of control icons is displayed. The subset of the full row of control icons includes a greater number of icons (e.g., 6 icons) than the collapsed row of control icons (e.g., having 3 icons), and however, the number of icons in the subset of the full row of control icons is equal to or less than the number of icons in the full row of control icons (e.g., 9 icons).

FIGS. 6A and 6B are two example UIs 600 and 650 of a media player application 102 showing two distinct subset of control icons in accordance with some implementations. The full row of control icon shown in FIG. 5B includes an ordered sequence of control icons that starts with a first control icon (e.g., a device rotation icon 502) and ends with a last control icon (e.g., an equalizer icon 532). A first subset of control icons are displayed on the UI 600, and include a first number of control icons starting with the first control icon of the ordered sequence of control icons. A second subset of control icons are displayed on the UI 650, and include a second number of control icons ended with the last control icon of the ordered sequence of control icons. As shown in the implementations depicted in FIGS. 6A and 6B, the first subset of control icons includes the control icons 502, 504, 506, 522, 524 and 526, and the second subset of control icons include the control icons 522, 524, 526, 528, 530 and 532.

The first subset of control icons is displayed with a first shift control icon 602, and the second subset of control icons is displayed with a second shift control icon 604. In response to a user activation of the first shift control icon 602, a third subset of control icons is displayed on the UI of the media player application 102. The third subset of control icons includes a third number of control icons (e.g., similar to a next page) in the full row of control icons. In some implementations (not depicted in FIGS. 6A and 6B), each of the third subset of control icons is distinct from the control icons in the first and second subsets of control icons, and the third subset of control icons are displayed with both the shift control icons 602 and 604 at its respective ends. In some situations, the third subset of control icons are identical to the second subset of control icons and displayed with the second shift control icon 604. Similarly, in response to a user activation of the second shift control icon 604, a fourth subset of control icons are displayed on the UI of the media player application 102. The fourth subset of control icons include a fourth number of control icons (e.g., similar to a previous page) in the full row of control icons. In some situations, each of the fourth subset of control icons is distinct from the control icons in the first and second subsets of control icons, and the fourth subset of control icons are displayed with both the shift control icons 602 and 604 at its respective ends. In some situations, the fourth subset of control icons are identical to the first subset of control icons and displayed with the first collapse control icon 602.

In some implementations, when a subset of the full row of control icons (e.g., the first and second subsets of control icons) are being displayed, a user swipe on the subset of displayed control icons moves additional control icons into the touch display while moving some of the displayed control icons out of the touch display. For example, FIG. 6A depicts that the user swipe 606 heads towards a left edge 222 of the touch display. The user swipe 606 causes one or more control icons following the first subset of control icons in the ordered sequence to be displayed on the UI 600, and one or more control icons (e.g., the device rotation icon 502) of the first subset of control icons gradually disappear from the display when the one or more control icons reaches the left edge 222 of the touch display. Optionally, while the first subset of control icons move on the touch display in response to the user swipe 606, the first subset of control icons if displayed keep a fixed position with respect to a current location of a finger on the touch display.

FIG. 6B depicts that the user swipe 608 heads towards a right edge 224 of the touch display. The user swipe 608 causes one or more control icons located before the second subset of control icons in the ordered sequence to be displayed on the UI 650, and one or more control icons (e.g., the equalizer icon 532) of the second subset of control icons gradually disappear from the display when the one or more control icons reaches the right edge 224 of the touch display. Optionally, while the second subset of control icons move on the touch display in response to the user swipe 608, the second subset of control icons if displayed keep a fixed position with respect to a current location of a finger on the touch display.

FIG. 7 is a flow diagram illustrating a method 700 for controlling media content display in accordance with some implementations. The method 700 is implemented at an electronic device having a touch display, a processor and memory storing at least one program for execution by the processor. While playing media content on the touch display using a media player application 102, without displaying any control icon of the media player application, the electronic device 700 detects (702) a user swipe (e.g., swipes 210 and 606 and 608) on the touch display including a sequence of contacts on a plurality of contact locations on the touch display, and determines (704) a plurality of contact characteristics of the user swipe. In some implementations, the plurality of contact locations fall on a substantially straight line. The plurality of contact characteristics include (706) a subset of the plurality of contact locations of the sequence of contacts on the touch display. In some implementations, an orientation angle of the user swipe is determined (708) with respect to a vertical axis of the touch display based on the subset of contact locations 708, and compared (710) with a threshold angle (e.g., 212). In accordance with the plurality of contact characteristics, the user swipe is associated (712) with one of a plurality of media play control options including a brightness adjustment, a sound volume adjustment and a forwarding/rewinding adjustment. The media player application 102 is then adjusted (714) according to the media play control option associated with the user swipe while concurrently displaying a progressive indicator (e.g., indicators 302, 304 and 402) corresponding to the media play control option and the user swipe until after completion of the user swipe on the touch display.

In some implementations, the plurality of contact characteristics of the user swipe include an orientation angle of the user swipe determined with respect to a predefined edge of the touch display based on the subset of contact locations, and the orientation angle is compared with a threshold angle. In some situations, it is determined that the orientation angle is greater than the threshold angle, and the user swipe is then associated with the forwarding/rewinding adjustment. Further, the subset of the plurality of contact locations includes a start location of the user swipe. In accordance with a determination that the user swipe moves towards a right edge of the touch display, the display of the media content is fast forwarded to a subsequent frame of the media content according to the subset of contact locations (e.g., according to a displacement of each contact location of the user swipe with respect to the start location of the user swipe). In accordance with a determination that the user swipe moves towards a left edge of the touch display, the display of the media content is rewound to a previous frame of the media content according to the subset of contact locations (e.g., according to the displacement of each contact location of the user swipe with respect to the start location of the user swipe). Further, in some implementations, the progressive indicator indicates one or more of a timestamp of each frame that is being displayed on the touch display and a relative change of play times due to the forwarding/rewinding adjustment. More details on the forwarding/rewinding adjustment are explained above with reference to FIGS. 2A-2B and 3A-3B.

Alternatively, in some implementations, it is determined that the orientation angle is not greater than the threshold angle. The sequence of contacts with respect to a volume control region. Optionally, a left portion of the touch display (e.g., the left half of the touch display) is designated as the volume control region, and a right portion of the touch display (e.g., the right half of the touch display) is designated as a brightness control region. Optionally, a first portion of the touch display is designated as the volume control region, and a second portion of the touch display is designated as a brightness control region. The first portion and the second portion do not overlap each other. The first portion and the second portion may have different sizes.

More specifically, in some implementations, in accordance with a determination that the user swipe is located substantially within the volume control region, the user swipe is associated with the volume adjustment. The subset of the plurality of contact locations includes a start location of the user swipe. When it is determined the user swipe moves towards a top edge of the touch display, a volume associated with the display of the media content is increased according to the subset of contact locations (e.g., the displacement of each contact location of the user swipe with respect to the start location of the user swipe). When it is determined that the user swipe moves towards a bottom side of the touch display, the volume associated with the display of the media content is determined according to the subset of contact locations (e.g., the displacement of each contact location of the user swipe with respect to the start location of the user swipe). In some implementations, the progressive indicator indicates a change of the volume associated with the display of the media content.

Alternatively, in some implementations, it is determined that the user swipe is located substantially external to the volume control region or within the brightness control region. The user swipe is associated with the brightness adjustment. When it is determined that the user swipe moves towards a top side of the touch display, a brightness level associated with the display of the media content is increased according to the subset of contact positions (e.g., the displacement of each contact location of the user swipe with respect to the start location of the user swipe). When it is determined that the user swipe moves towards a bottom side of the touch display, the brightness level associated with the display of the media content is decreased according to the subset of contact positions (e.g., the displacement of each contact location of the user swipe with respect to the start location of the user swipe). In some implementations, the progressive indicator indicates a change of the brightness level associated with the display of the media content. More details on the brightness and volume adjustments are explained above with reference to FIGS. 2A-2B and 4A-4B.

In some implementations, the plurality of media control options further include an icon position adjustment for moving additional control icons into the touch display. A plurality of control icons is displayed (716) on the media player application 102, while playing the media content on the touch display and adjusting the media player application 102 according to the media play control option associated with the user swipe (e.g., the user swipe 606 or 608). As shown in FIG. 6A or 6B, the plurality of control icons are arranged for display on the touch display in a row. Specifically, the media player application 102 is adjusted by: in response to detecting the user swipe 606 or 608 falls substantially on the row, moving the additional control icons into the row while shifting the plurality of control icons on the row and moving a subset of the plurality of control icons (e.g., the device rotation icon 502 in FIG. 6A, the equalizer icon 532 in FIG. 6B) out of the touch display. In some implementations, the plurality of contact locations of the user swipe 606 or 608 fall on a substantially straight line aligned with the row of control icons. More details are explained above with reference to FIGS. 5A-5B and 6A-6B.

Figure 8:
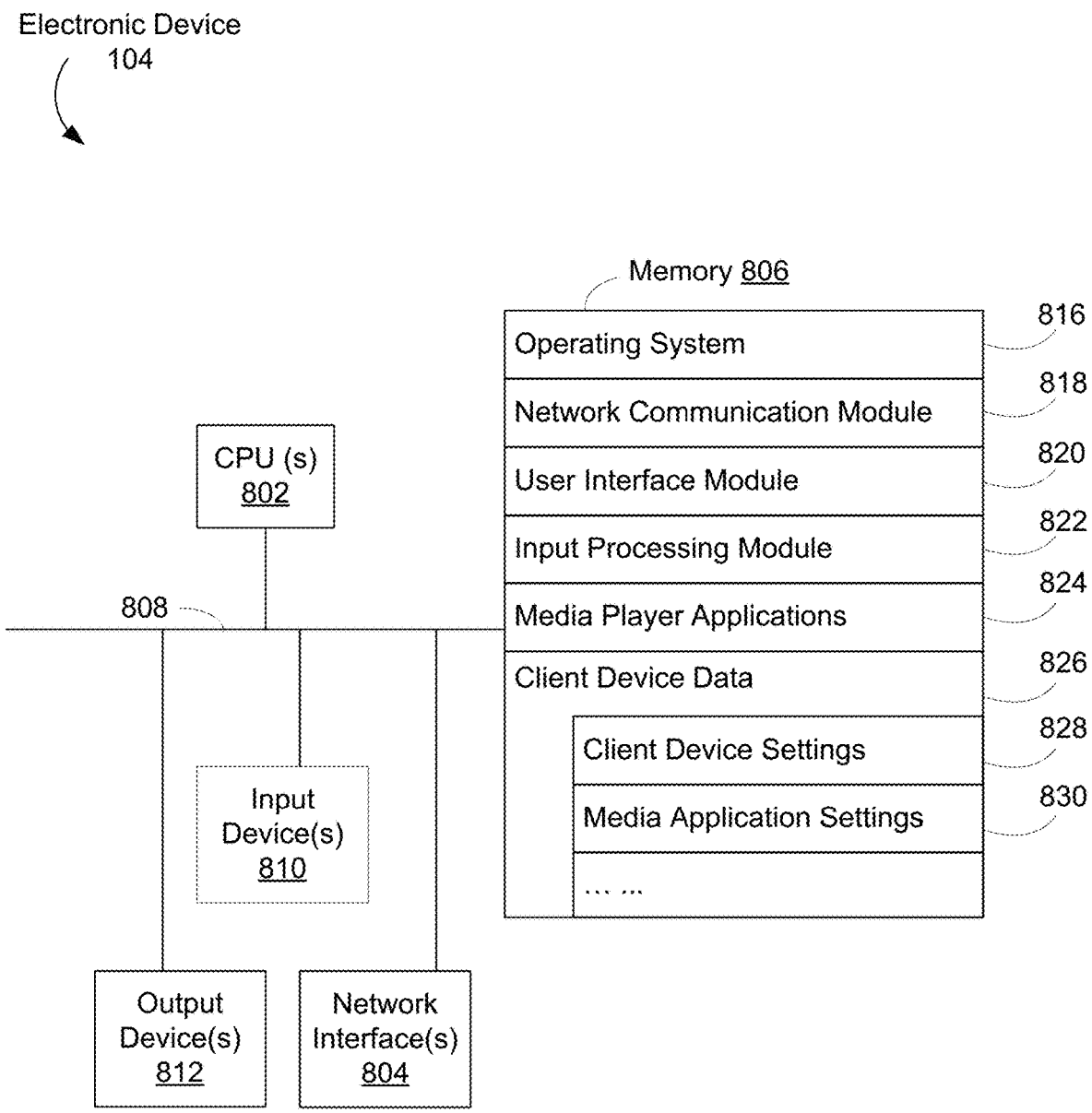
FIG. 8 is an example electronic device configured to implement the method for controlling media content display in accordance with some implementations.

FIG. 8 is an example electronic device 104 configured to implement the method 700 for controlling media content display in accordance with some implementations. Examples of the electronic device 104 include, but are not limited to, a mobile phone, a tablet computer and a wearable personal device. The electronic device 104, typically, includes one or more processing units (CPUs) 802, one or more network interfaces 804, memory 806, and one or more communication buses 808 for interconnecting these components (sometimes called a chipset). The electronic device 104 includes one or more input devices 810 that facilitate user input, such as a keyboard, a mouse, a voice-command input unit or microphone, a touch screen display, a touch-sensitive input pad, a gesture capturing camera, or other input buttons or controls. In some implementations, the electronic device 104 includes one or more cameras, scanners, or photo sensor units for capturing images. The electronic device 104 also includes one or more output devices 812 that enable presentation of user interfaces and display content, including one or more speakers and/or one or more visual displays. In some implementations, the electronic device 104 includes a touch display that detects user touch events while presenting user interfaces or displaying media content on the same touch display.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 816 including procedures for handling various basic system services and for performing hardware dependent tasks;
- Network communication module 818 for connecting the electronic device 104 to other devices (e.g., the server system 140, the cast device 108, the electronic device 190, the smart home devices 120 and the other client devices 104) via one or more network interfaces 804 (wired or wireless) and one or more networks 110, such as the Internet, other wide area networks, local area networks, metropolitan area networks, and so on;
- User interface module 820 for enabling presentation of information (e.g., a graphical user interface for presenting media player application 824, widgets, websites and web pages thereof, and/or games, text, etc.) at the electronic device 104 via one or more output devices 812 (e.g., displays, speakers, etc.);
- Input processing module 822 for detecting one or more user inputs or interactions from one of the one or more input devices 810 and interpreting the detected input or interaction, e.g., detecting a user swipe and determining a plurality of contact characteristics of the user swipe;
- Media player application 824 that is executed to provide client-side functionalities for media display and user account management associated with corresponding media sources, e.g., associating a user swipe with one of a plurality of media play control options and controlling display of media content according to the associated media play control option; and
- Client data 826, including:
    - Client device settings 828 for storing information associated with the electronic device 104 itself, including common device settings (e.g., service tier, device model, storage capacity, processing capabilities, communication capabilities, etc.), and information for automatic media display control; and
    - Media player application settings 830 for storing information associated with user accounts of one or more media player applications 824, including one or more of account access information, user preferences of media content types, review history data, and information for automatic media display control.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for controlling media content display on an electronic device having a touch display, a processor and memory storing at least one program for execution by the processor, the method comprising:
while playing media content on the touch display using a media player application, without displaying any control icon of the media player application, the media player providing a plurality of media control options implemented independently of any control icon of the media player application including a brightness adjustment, a volume adjustment, and a forwarding/rewinding adjustment, each media control option associated with different swipe gesture characteristics:
detecting a user swipe on the touch display including a sequence of contacts on a plurality of contact locations on the touch display;
determining a plurality of contact characteristics of the user swipe, wherein the plurality of contact characteristics include a subset of the plurality of contact locations of the sequence of contacts on the touch display;
determining the media control option associated with the user swipe based on the plurality of contact characteristics;
while the user swipe continues on the touch display:
continuously adjusting the media player application according to the media play control option associated with the user swipe; and
concurrently displaying a progressive indicator corresponding to the media play control option and a current position of the user swipe on the touch display; and
after detecting a completion of the user swipe on the touch display:
removing the progressive indicator from the touch display and playing the media content on the touch display using the media player application according to a last position of the user swipe on the touch display;
wherein the progressive indicator for the forwarding/rewinding control option comprises indicia that displays a total length of the media content, a timestamp of each frame to which a display of the media content is forwarded or rewound on the touch display, and a relative change of play times due to the forwarding or rewinding adjustment; the progressive indicator for the brightness adjustment control option comprises indicia that displays a graphic element representing a change of the brightness level associated with the display of the media content; and the progressive indicator for the volume adjustment control option comprises indicia that displays a graphic element representing a change of the volume associated with the display of the media content.

2. The method of claim 1, wherein determining the plurality of contact characteristics of the user swipe further comprises:
determining an orientation angle of the user swipe with respect to a predefined edge of the touch display based on the subset of contact locations; and
comparing the orientation angle with a threshold angle.

3. The method of claim 2, wherein determining the plurality of contact characteristics of the user swipe further comprises:
determining that the orientation angle is not greater than the threshold angle; and
locating the sequence of contacts with respect to a volume control region.

4. The method of claim 3, wherein a left portion of the touch display is designated as the volume control region, and a right portion of the touch display is designated as a brightness control region.

5. The method of claim 3, wherein:
a first portion of the touch display is designated as the volume control region;
a second portion of the touch display is designated as a brightness control region; and
the first portion and the second portion do not overlap each other.

6. The method of claim 5, wherein the user swipes up or down in the volume control region and in the brightness control region and the user swipes up or down to control the volume of the media content is only performed in the volume control region and the user swipes up or down to control the brightness of the media content is only performed in the brightness control region.

7. The method of claim 3, wherein associating the user swipe with the one of the plurality of media play control options further comprises:
in accordance with a determination that the user swipe is located substantially within the volume control region, associating the user swipe with the volume adjustment.

8. The method of claim 7, wherein the subset of the plurality of contact locations includes a start location of the user swipe, and adjusting the media player application further comprises:
in accordance with a determination that the user swipe moves towards a top edge of the touch display, increasing a volume associated with the display of the media content according to the displacement of each contact location of the user swipe with respect to the start location of the user swipe; and
in accordance with a determination that the user swipe moves towards a bottom side of the touch display, decreasing the volume associated with the display of the media content according to the displacement of each contact location of the user swipe with respect to the start location of the user swipe.

9. The method of claim 3, wherein associating the user swipe with the one of the plurality of media play control options further comprises:
in accordance with a determination that the user swipe is located substantially external to the volume control region, associating the user swipe with a brightness adjustment.

10. The method of claim 9, wherein the subset of the plurality of contact locations includes a start location of the user swipe, and adjusting the media player application further comprises:
in accordance with a determination that the user swipe moves towards a top side of the touch display, increasing a brightness level associated with the display of the media content according to the displacement of each contact location of the user swipe with respect to the start location of the user swipe; and
in accordance with a determination that the user swipe moves towards a bottom side of the touch display, decreasing the brightness level associated with the display of the media content according to the displacement of each contact location of the user swipe with respect to the start location of the user swipe.

11. A non-transitory computer-readable medium, having instructions stored thereon, which when executed by one or more processors cause the processors to perform operations comprising:

while playing media content on a touch display using a media player application, without displaying any control icon of the media player application, the media player providing a plurality of media control options implemented independently of any control icon of the media player application including a brightness adjustment, a volume adjustment, and a forwarding/rewinding adjustment, each media control option associated with different swipe gesture characteristics:

detecting a user swipe on the touch display including a sequence of contacts on a plurality of contact locations on the touch display;

determining a plurality of contact characteristics of the user swipe, wherein the plurality of contact characteristics include a subset of the plurality of contact locations of the sequence of contacts on the touch display;

determining the media control option associated with the user swipe based on the plurality of contact characteristics;

while the user swipe continues on the touch display:
continuously adjusting the media player application according to the media play control option associated with the user swipe; and
concurrently displaying a progressive indicator corresponding to the media play control option and a current position of the user swipe on the touch display; and after detecting a completion of the user swipe on the touch display:
removing the progressive indicator from the touch display and playing the media content on the touch display using the media player application according to a last position of the user swipe on the touch display;

wherein the progressive indicator for the forwarding/rewinding control option comprises indicia that displays a total length of the media content, a timestamp of each frame to which a display of the media content is forwarded or rewound on the touch display, and a relative change of play times due to the forwarding or rewinding adjustment; the progressive indicator for the brightness adjustment control option comprises indicia that displays a graphic element representing a change of the brightness level associated with the display of the media content; and the progressive indicator for the volume adjustment control option comprises indicia that displays a graphic element representing a change of the volume associated with the display of the media content.

12. The non-transitory computer-readable medium of claim 11, wherein the instructions when executed by one or more processors cause the processors to perform operations further comprising:

displaying a plurality of control icons on the media player application, while playing the media content on the touch display and adjusting the media player application according to the media play control option associated with the user swipe.

13. The non-transitory computer-readable medium of claim 12, wherein:

the plurality of control icons are arranged for display on the touch display in a row;

the plurality of media control options further include an icon position adjustment for moving additional control icons into the touch display; and adjusting the media player application further comprises:
in response to detecting the user swipe falls substantially on the row, moving the additional control icons into the row while shifting the plurality of control icons on the row and moving a subset of the plurality of control icons out of the touch display.

14. The non-transitory computer-readable medium of claim 11, wherein the plurality of contact locations fall on a substantially straight line.

15. An electronic device, comprising: a touch display; one or more processors; and memory having instructions stored thereon, which, when executed by the one or more processors, cause the processors to perform operations for:

while playing media content on the touch display using a media player application, without displaying any control icon of the media player application, the media player providing a plurality of media control options implemented independently of any control icon of the media player application including a brightness adjustment, a volume adjustment, and a forwarding/rewinding adjustment, each media control option associated with different swipe gesture characteristics:

detecting a user swipe on the touch display including a sequence of contacts on a plurality of contact locations on the touch display;

determining a plurality of contact characteristics of the user swipe, wherein the plurality of contact characteristics include a subset of the plurality of contact locations of the sequence of contacts on the touch display;

determining the media control option associated with the user swipe based on the plurality of contact characteristics;

while the user swipe continues on the touch display:
continuously adjusting the media player application according to the media play control option associated with the user swipe; and
concurrently displaying a progressive indicator corresponding to the media play control option and a current position of the user swipe on the touch display; and after detecting a completion of the user swipe on the touch display:
removing the progressive indicator from the touch display and playing the media content on the touch display using the media player application according to a last position of the user swipe on the touch display;

wherein the progressive indicator for the forwarding/rewinding control option comprises indicia that displays a total length of the media content, a timestamp of each frame to which a display of the media content is forwarded or rewound on the touch display, and a relative change of play times due to the forwarding or rewinding adjustment; the progressive indicator for the brightness adjustment control option comprises indicia that displays a graphic element representing a change of the brightness level associated with the display of the media content; and the progressive indicator for the volume adjustment control option comprises indicia that displays a graphic element representing a change of the volume associated with the display of the media content.

16. The electronic device of claim 15, wherein determining the plurality of contact characteristics of the user swipe further comprises:
- determining an orientation angle of the user swipe with respect to a predefined edge of the touch display based on the subset of contact locations; and
- comparing the orientation angle with a threshold angle.

17. The electronic device of claim 16, wherein associating the user swipe with the one of the plurality of media play control options further comprises:
- in accordance with a determination that the orientation angle is greater than the threshold angle, associating the user swipe with a forwarding/rewinding adjustment.

18. The electronic device of claim 17, wherein the subset of the plurality of contact locations includes a start location of the user swipe, and adjusting the media player application further comprises:
- in accordance with a determination that the user swipe moves towards a right edge of the touch display, fast forwarding the display of the media content to a subsequent frame of the media content according to a displacement of each contact location of the user swipe with respect to the start location of the user swipe; and
- in accordance with a determination that the user swipe moves towards a left edge of the touch display, rewinding the display of the media content to a previous frame of the media content according to the displacement of each contact location of the user swipe with respect to the start location of the user swipe.

\* \* \* \* \*